US 6,394,926 B1

(12) United States Patent
Jang

(10) Patent No.: US 6,394,926 B1
(45) Date of Patent: May 28, 2002

(54) POWERTRAIN FOR AUTOMATIC TRANSMISSION AND HYDRAULIC CONTROL SYSTEM FOR CONTROLLING THE SAME

(75) Inventor: Jae-Duk Jang, Yongin (KR)

(73) Assignee: Hyundai Motor Co., Seoul (KR)

( * ) Notice: Subject to any disclaimer, the term of this patent is extended or adjusted under 35 U.S.C. 154(b) by 61 days.

(21) Appl. No.: 09/667,708

(22) Filed: Sep. 22, 2000

(30) Foreign Application Priority Data

Dec. 15, 1999 (KR) .............................................. 99-57863

(51) Int. Cl.[7] .............................................. F16H 61/12
(52) U.S. Cl. ...................... 475/116; 477/119; 477/118; 477/906
(58) Field of Search ................................ 477/906, 118, 477/119; 475/116, 118, 120

(56) References Cited

U.S. PATENT DOCUMENTS 5,681,241 A * 10/1997 Kubo et al. ................. 477/130
5,941,794 A * 8/1999 Jang ........................... 477/143
6,027,427 A * 2/2000 Yoo ............................ 477/130

* cited by examiner

Primary Examiner—Rodney H. Bonck
Assistant Examiner—Eric M. Williams
(74) Attorney, Agent, or Firm—Birch, Stewart, Kolasch & Birch, LLP

(57) ABSTRACT

A hydraulic pressure distributor includes a low control valve, an N-R control valve, a line pressure control switch valve, a first fail-safe valve controlled by control pressure supplied from the low control valve and from the second pressure control valve, the first fail-safe valve undergoing port conversion to supply hydraulic pressure supplied from the third pressure control valve to the second clutch in the third and fourth speeds of the drive D range, and hydraulic pressure supplied from the third pressure control valve to the first brake in the low L range, and a second fail-safe valve controlled by reverse pressure, hydraulic pressure supplied to a fourth clutch, and hydraulic pressure supplied to the third clutch, the second fail-safe valve supplying hydraulic pressure supplied from the second pressure control valve to the second brake in the second and fourth speeds of the drive D range, and an engine brake control switch valve for supplying D-range pressure to the fourth clutch in the first and third speeds of the drive D range.

16 Claims, 13 Drawing Sheets

| Operational Chart | | | | | | | | | Engine Brake Effect |
|---|---|---|---|---|---|---|---|---|---|
| Range | | C1 | C2 | C3 | C4 | B1 | B2 | F1 | F2 | |
| P | | | | | | | | | | |
| R | | | | ● | | ● | | | | ○ |
| N | | | | | | | | | | |
| D | 1 | ● | | | | | | ▲ | ▲ | |
| D | 2 | ● | | | | | ● | | ▲ | |
| D | 3 | ● | ● | | | | | | ▲ | |
| D | 4 | ● | ● | | | | ● | | | ○ |
| 3 | 1 | ● | | | | | | ▲ | ▲ | |
| 3 | 2 | ● | | | | | ● | | ▲ | |
| 3 | 3 | ● | ● | | ◎ | | | | △ | ○ |
| 2 | 1 | ● | | | ◎ | | | ▲ | △ | |
| 2 | 2 | ● | | | ◎ | | ● | | △ | ○ |
| L | 1 | ● | | | ◎ | ◎ | | △ | △ | ○ |

POWERTRAIN FOR AUTOMATIC TRANSMISSION AND HYDRAULIC CONTROL SYSTEM FOR CONTROLLING THE SAME

BACKGROUND OF THE INVENTION (a) Field of the Invention

The present invention relates to a powertrain for an automatic transmission and a hydraulic control system for controlling the powertrain.

(b) Description of the Related Art

Conventional automatic transmissions used in vehicles include a torque converter, a multi-stage gear shift mechanism connected to the torque converter, and a plurality of friction elements actuated by hydraulic pressure for selecting one of the gear stages of the gear shift mechanism, the gear shift mechanism being realized through a planetary gearset. The friction elements are controlled to engaged and disengaged states by a hydraulic control system, which controls pressure generated by an fluid pump, to change shift ratios of the planetary gearset.

The friction elements are selectively operated by a plurality of valves, which undergo port conversion to change the flow of hydraulic pressure, and actuators supplying hydraulic pressure to the valves. Further, a manual valve, indexed with a driver-operated shift selector to realize port conversion, is connected to a plurality of lines to supply hydraulic pressure from the fluid pump to each valve and actuator.

Solenoid valves are operated to ON and OFF states in different combinations to realize control into the various speeds and shift modes. That is, as described above, the solenoid valves are operated to ON and OFF states such that the supply of hydraulic pressure to the valves is controlled. This, in turn, controls the supply of hydraulic pressure to specific friction elements to control the same, thereby ultimately controlling the multi-stage gear shift mechanism for control into the different shift speeds and modes.

However, in the prior art hydraulic control system, an engine brake is applied frequently at unsuitable times such that drive performance is reduced. Also, fail-safe means in case the transmission malfunctions is not provided.

SUMMARY OF THE INVENTION

The present invention has been made in an effort to solve the above problems.

It is a first objective of the present invention to provide a powertrain and a hydraulic control system for controlling the same that can apply an engine brake at only the highest speed of each drive range, thereby improving shift quality.

It is a second objective of the present invention to provide a powertrain and a hydraulic control system for controlling the same that can provide a dual fail-safe mode such that in a drive D range, a fourth speed hold is realized, and in a drive D3 range, a third speed hold is realized, thereby improving the drive performance.

It is a third objective of the present invention to provide a hydraulic control system that can improve shift quality by performing a release control using a one-way clutch throughout whole shift speeds.

BRIEF DESCRIPTION OF THE DRAWINGS

The accompanying drawings, which are incorporated and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
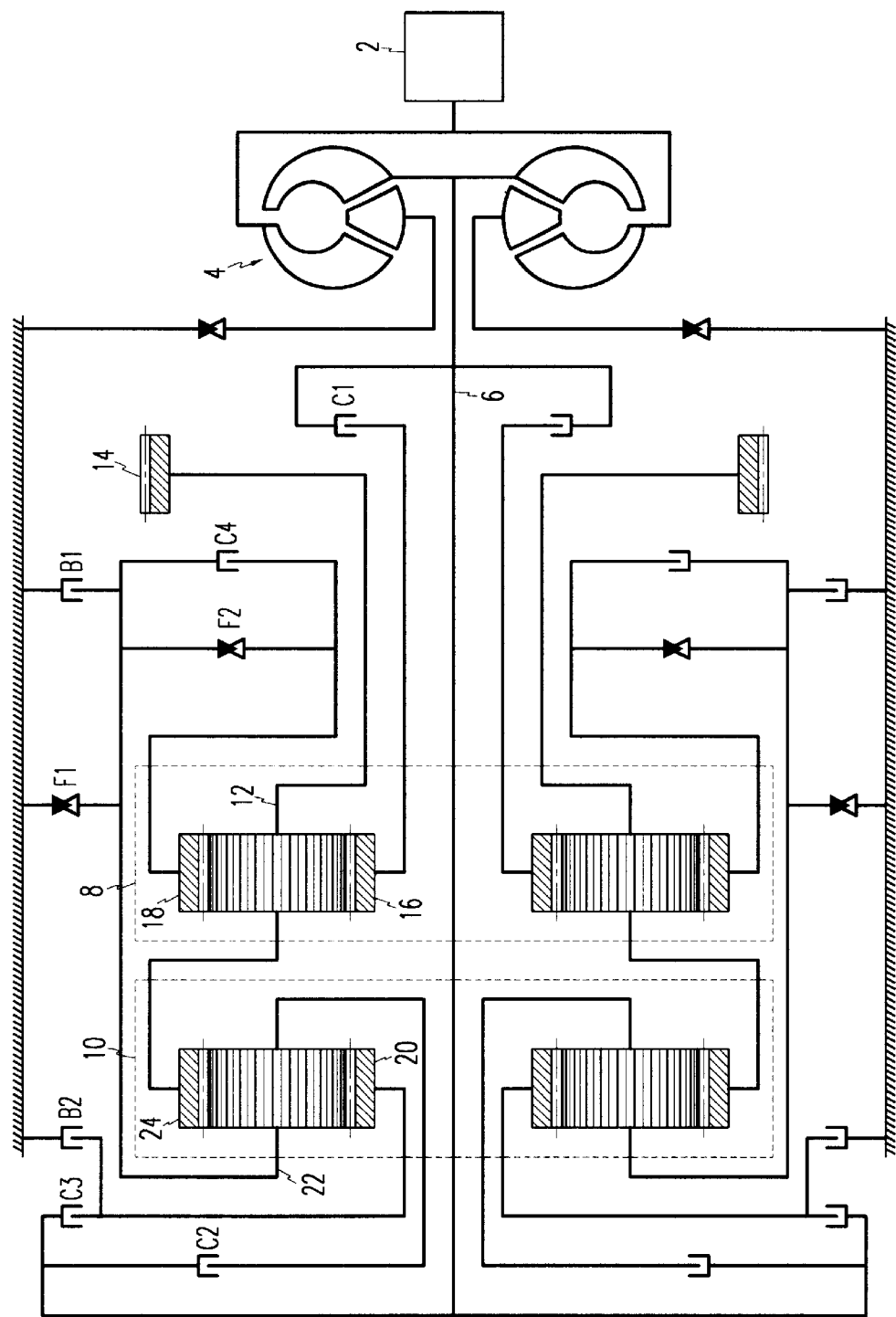
FIG. 1 is a schematic view of a powertrain according to a preferred embodiment of the present invention.

FIG. 1 shows a schematic view of a powertrain according to a preferred embodiment of the present invention.

The powertrain comprises two single pinion planetary gearsets designed to provide first, second, third and fourth forward speeds and a reverse speed. In more detail, torque from an engine 2 is transmitted to an input shaft 6 through a torque converter 4, and the input shaft 6 transmits the engine torque to first and second single pinion planetary gearsets 8 and 10. Shifting into the different ranges and speeds is realized by the operation of the first and second pinion planetary gearsets 8 and 10, after which output is realized via a transfer drive gear 14.

The first single pinion planetary gearset 8 includes a first sun gear 16, a first planet carrier 12 and a first ring gear 18. The second single pinion planetary gearset includes a second sun gear 20, a second planet carrier 22 and a second ring gear 24. Output through the transfer drive gear 14 is realized by the connection of the transfer drive gear 14 to the first planet carrier 12 of the first single pinion planetary gearset 8.

In a state where the first planet carrier 12 is fixedly connected to the second ring gear 24, the first sun gear 16 is connected to the input shaft 6 with a first clutch C1 interposed therebetween, the first clutch C1 being engaged in all forward speeds. The second planet carrier 22 is connected to the input shaft 6 with a second clutch C2 interposed therebetween, the second clutch C2 being engaged in the forward third and fourth speeds. Also, the second sun gear 20 is connected to the input shaft 6 with a third clutch C3 interposed therebetween, the third clutch C3 being engaged in a reverse R range.

Further, the second planet carrier 22 is connected to a transmission housing 26 with a first brake B1 and a first one-way clutch F1 interposed therebetween, the first brake B1 and the first one-way clutch F1 being mounted in parallel. The second planet carrier 22 is also connected to the first ring gear 18 with a fourth clutch C4 and a second one-way clutch F2 interposed therebetween, the fourth clutch C4 and the second one-way clutch F2 being mounted in parallel. In addition, the second sun gear 20 is connected to the transmission housing 26 with a second brake B2 interposed therebetween.

Figures 2, 4:
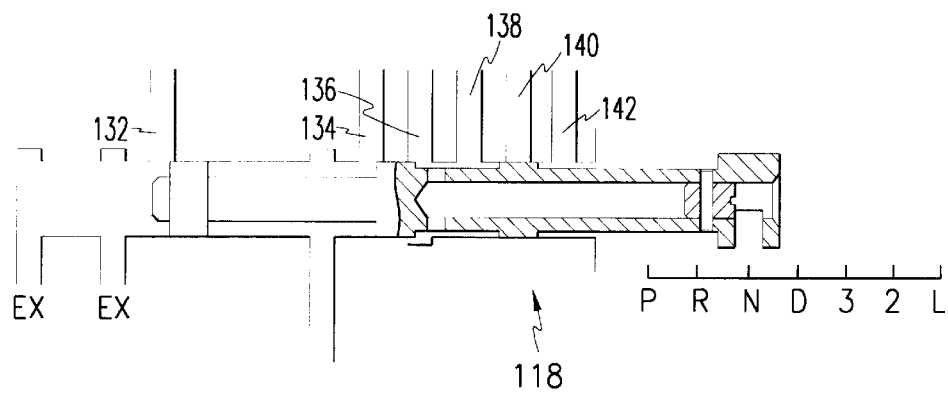
FIG. 2 is a chart illustrating engaged and disengaged states of friction elements of the powertrain of FIG. 1 according to various speeds and shift modes.
FIG. 4 is a schematic sectional view of a manual valve of the hydraulic control system of FIG. 3.

The friction elements of the powertrain described above are engaged and disengaged to effect shifting as shown in FIG. 2.

That is, to realize shifting into the forward first speed, the first clutch C1 and the first and second one-way clutches F1 and F2 are engaged such that the first sun gear 16 operates as an input element, and a combination of the first ring gear 18 and the second planet carrier 22 operates as a reaction element. In the forward second speed from the forward first speed, the second brake B2 is additionally engaged and the one-way clutch F1 is disengaged such that the first sun gear 18 acts as an input element and the second sun gear 20 acts as a reaction element.

Further, to effect shifting into the forward third speed from the forward second speed, the second clutch C2 is engaged and the second brake B2 is disengaged such that the first and second pinion planetary gearsets 8 and 10 are directly connected, thereby realizing output that is of the same rotational speed as input. In the forward fourth speed, the second brake B2 is additionally engaged and the one-way clutch F2 is disengaged such that the second sun gear 20 acts as a reaction element. This results in an overdrive state.

To realize shifting into the reverse R range, the third clutch C3 and the first brake B1 are engaged such that the second sun gear 20 acts as an input element and the second planet carrier 22 acts as a reaction element, resulting in shifting into the reverse R range.

Figure 3:
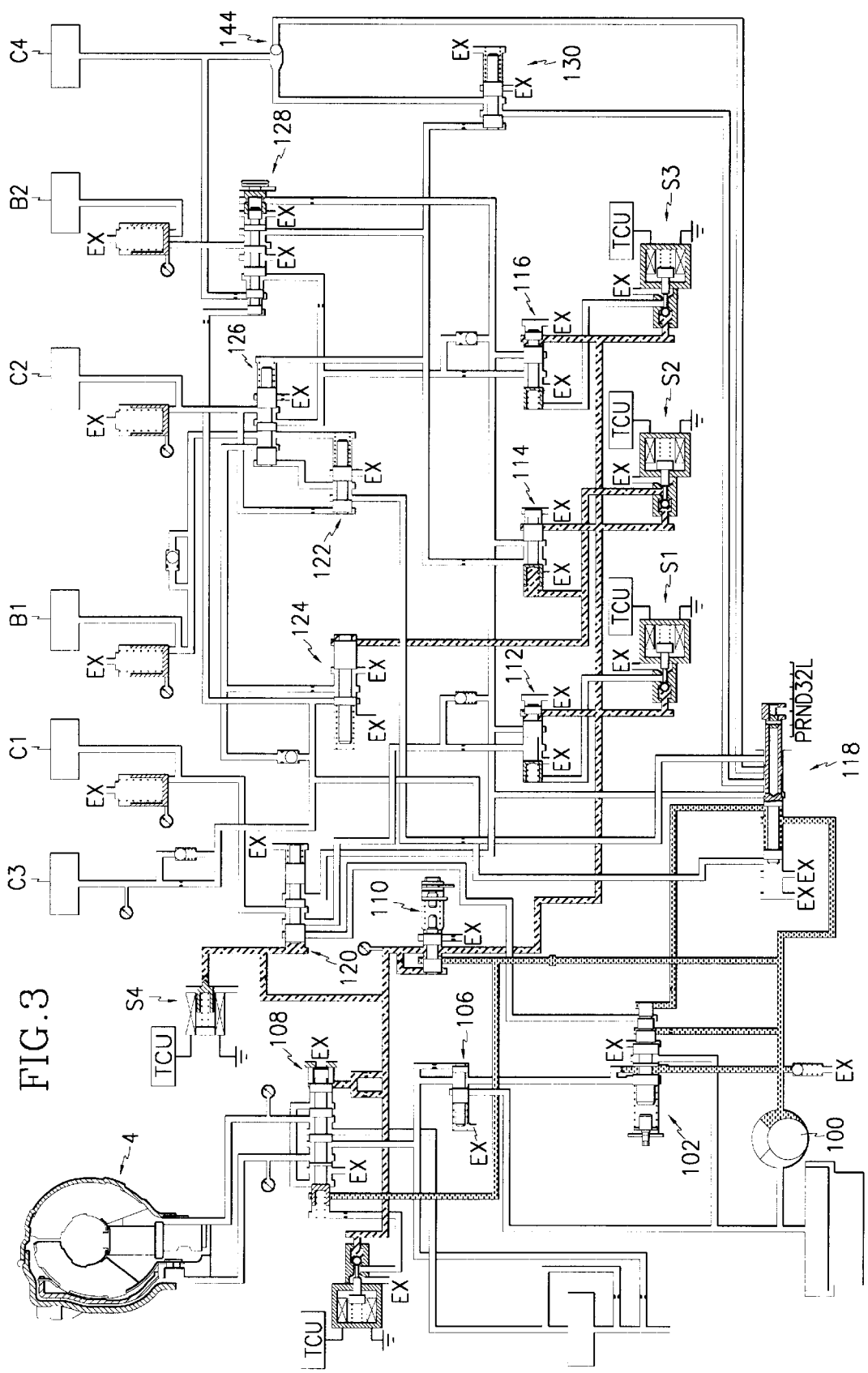
FIG. 3 is a hydraulic circuit diagram in a neutral N range of a hydraulic control system according to a preferred embodiment of the present invention.

FIG. 3 is a hydraulic circuit diagram in a neutral N range of the hydraulic control system according to the present invention. Like reference numerals are used for the elements described above.

The hydraulic control system includes the torque converter 4 for converting torque of engine power and transmitting the converted torque to a transmission, and an fluid pump 100 for generating hydraulic fluid used for lubricant and controlling the torque converter and each shifting speed. hydraulic fluid generated by the fluid pump 100 is distributed to a pressure/damper clutch control part, a pressure reducing part, and a shift control part.

The pressure/damper clutch control part includes a pressure regulating valve 102 for controlling to a predetermined level the hydraulic fluid generated from of the fluid pump 100; a torque converter control valve 106 for supplying the hydraulic fluid received from the pressure regulating valve 102 to the torque converter 4 and to locations to be used for lubrication, and a damper clutch control valve 108 for controlling a damper clutch such that the power transmission efficiency of the torque converter 4 is increased.

The pressure reducing part includes a reducing valve 110 for reducing hydraulic fluid passing therethrough to a level lower than the line pressure. A part of the hydraulic fluid reduced by the reducing valve 110 is supplied as control pressure of the damper clutch control valve 108. A part of the hydraulic fluid reduced by the reducing valve is also supplied to a hydraulic fluid control part. The hydraulic fluid control part includes first, second and third pressure control valves 112, 114 and 116 for forming hydraulic pressure for use as shift range control pressure, and including first, second and third solenoid valves S1, S2 and S3 for controlling the first, second and third pressure control valves 112, 114 and 116, respectively.

The shift control part includes a manual valve 118 which is indexed with a driver-controlled select lever to undergo port conversion. According to the shift range selected by the driver, hydraulic pressure supplied to the manual valve 118 is (a) controlled by the hydraulic pressure control means, (b) supplied directly to a low control valve 122 and an N-R control valve 124, a line pressure control switch valve 120, first and second fail-safe valves 126 and 128, and a brake control switch valve 130, the switch valve 120, the N-R control valve 122, the line pressure control switch valve 120, the first and second fail-safe valves 126 and 128, and the engine brake control switch valve 130, or (c) supplied directly to the friction elements.

The manual valve 118, as shown in FIG. 4, is connected to a reverse R range pressure line 132, a forward pressure line 134, a drive D range pressure line 136, a drive D3 range pressure line 138, a drive D2 range pressure line 140, and a low L range pressure line 142. Hydraulic pressure supplied from the fluid pump 100 is selectively supplied to these lines according to the shift range selected by the driver.

The reverse R range pressure line 132 is directly connected with the third clutch C3, and the forward pressure line 134 is connected to a pressure regulator valve 102. The drive D range pressure line 136 is connected to the first, second and third pressure control valves 112, 114 and 116, the line pressure control switch valve 120, the second fail-safe valve 128. The drive D3 range pressure line 138 is connected to the engine brake control valve 130, and the drive D2 range pressure line 140 is connected to the fourth clutch C4 via a 3-way valve 144. The low L range pressure line 142 is connected to the low control valve 122.

Figure 5:
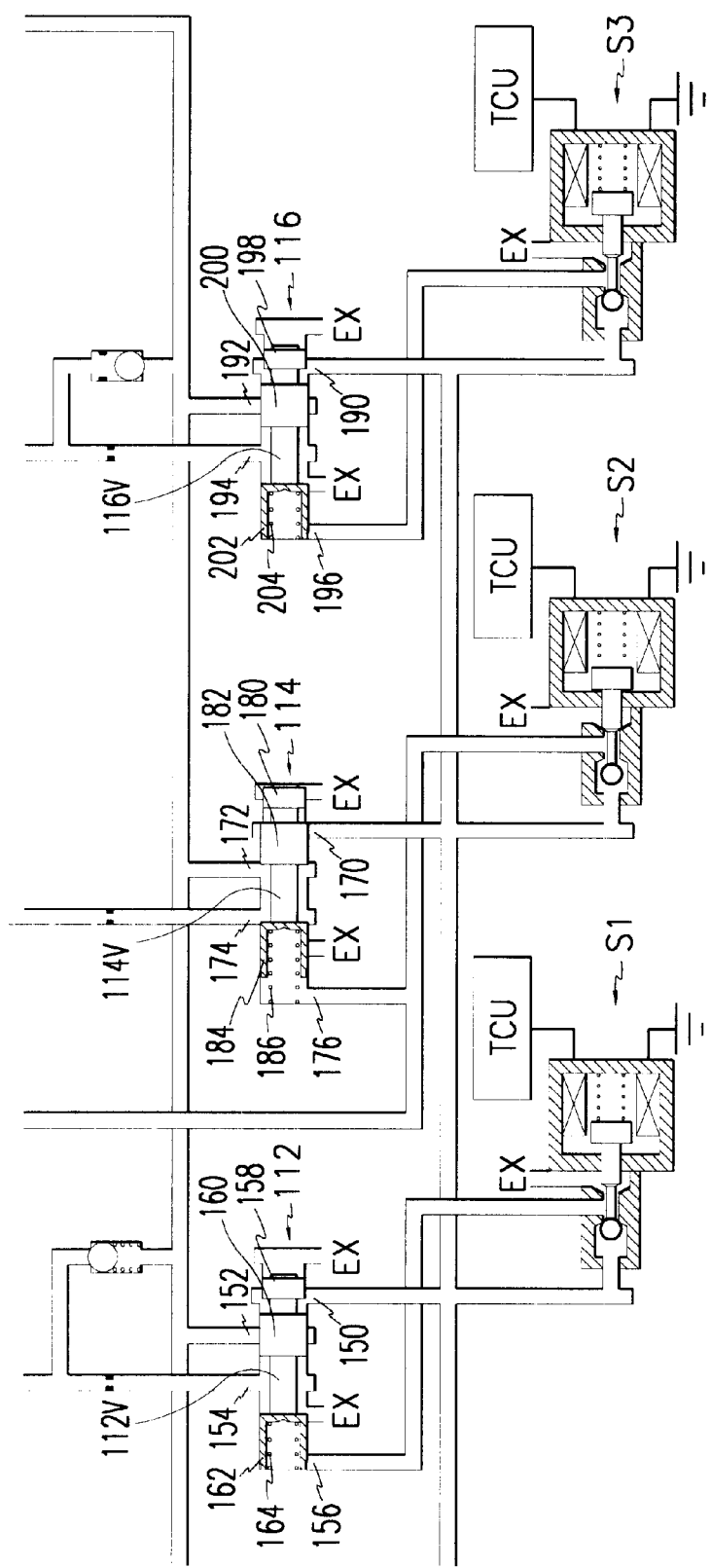
FIG. 5 is a schematic sectional view of elements used to control hydraulic pressure in the hydraulic control system of FIG. 3.
Figure 6:
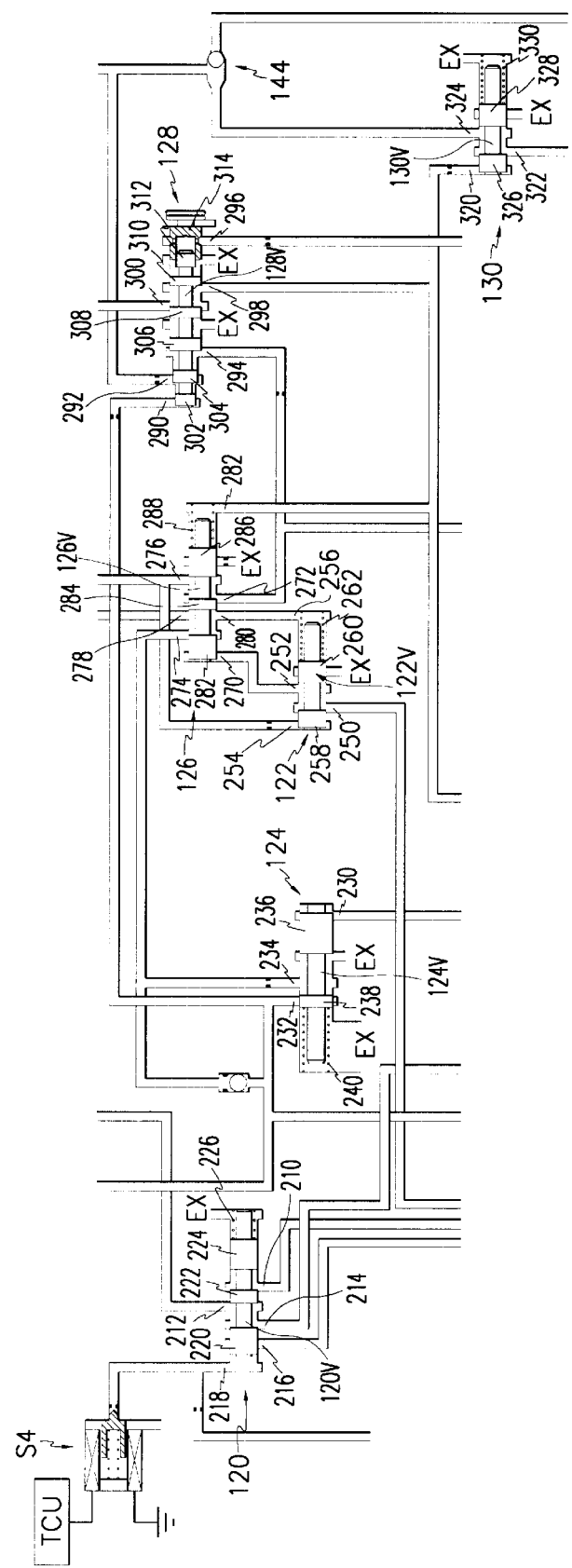
FIG. 6 is a schematic sectional view of elements used to control the distribution of hydraulic pressure in the hydraulic control system of FIG. 3.

As shown in FIG. 5, the first pressure control valve 112 of the hydraulic pressure control part is provided with a first port 150 for receiving the hydraulic pressure reduced by the reducing valve 110, a second port 152 for receiving hydraulic pressure from the manual valve 118, a third port 154 for supplying the hydraulic pressure received through the second port 152 to the switch valve 120, and a fourth port 156 for receiving control pressure from the first solenoid valve S1.

The first pressure control valve 112 includes a valve spool 112V. The valve spool 112V includes a first land 158 on which the hydraulic pressure supplied through the first port 150 acts, the first land 158 having a relatively small diameter, a second land 160 on which the hydraulic pressure supplied through the first port 150 acts to selectively open and close the second port 152, and a third land 162 which, together with the second land 160, selectively communicates the second port 152 and the third port 154. The first pressure control valve 112 further includes an elastic member 164 disposed between the third land 162 and the valve body, the elastic member 164 biasing the valve spool against hydraulic pressure acting on the second land 160.

The first solenoid valve S1, which controls the first pressure control valve 112, is a 3-way valve. When the first solenoid valve S1 is controlled to on, the hydraulic pressure supplied as control pressure to the first pressure control valve 112 is exhausted in a state where the supply of reduced pressure to the first pressure control valve 112 is blocked. On the other hand, when the first solenoid valve S1 is controlled to off, an exhaust port of the first solenoid valve S1 is closed and a passage to enable to supply of reduced pressure to the first pressure control valve 112 is formed. A more detailed description of the first solenoid valve S1 will not be provided herein as the structure and operation of the first solenoid valve S1 are well known in the art.

Accordingly, when the first solenoid valve S1 is controlled to on, the valve spool of the first pressure control valve 112 is displaced to the right (in the drawing) such that the second port 152 is closed. However, if the first solenoid valve S1 is controlled to off, control pressure is supplied to the first pressure control valve 112 such that the valve spool of the same is displaced to the left (in the drawing), thereby resulting in the communication of the second port 152 and the third port 154. This results in hydraulic pressure being supplied to the the switch valve 120.

The second pressure control valve 114 of the hydraulic pressure control part is provided with a first port 170 for receiving hydraulic pressure reduced by the reducing valve 110, a second port 172 for receiving hydraulic pressure from the manual valve 118, a third port 174 for supplying the hydraulic pressure received through the second port 172 to the first and second fail-safe valves 126 and 18 and the brake control switch valve 130, a fourth port 176 for receiving control pressure from the second solenoid valve S2, and a fifth port 178 for supplying the hydraulic pressure received through the fourth port 176 to the N-R control valve 124 as control pressure.

The second pressure control valve 114 comprises a valve spool 114V. The valve spool 114V comprises a first land 180 on which the hydraulic pressure supplied through the first port 170 acts, the first land 180 having a relatively small diameter, a second land 182 on which the hydraulic pressure supplied through the first port 170 acts to selectively open and close the second port 172, and a third land 184 which, together with the second land 182, selectively communicates the second port 172 and the third port 174. Further, an elastic member 186 is disposed between the third land 184 and the valve body, the elastic member 164 biasing the valve spool 114V against hydraulic pressure supplied through the first port 170 and acting on the second land 182.

When the second solenoid valve S2 is controlled to on, the valve spool 114V of the second pressure control valve 114 is displaced to the right (in the drawing) such that the second port 172 is closed. However, if the second solenoid valve S2 is controlled to off, control pressure is supplied to the second pressure control valve 114 such that the valve spool of the same is displaced to the left (in the drawing), thereby resulting in the communication of the second port 172 and the third port 174.

The third pressure control valve 116 is provided with a first port 190 for receiving hydraulic pressure reduced by the reducing valve 110, a second port 192 for receiving hydraulic pressure from the manual valve 118, a third port 194 for supplying the hydraulic pressure received through the second port 192 to the first and second fail-safe valves 126 and 128, and a fourth port 196 for receiving control pressure from the third solenoid valve S3.

The third pressure control valve 116 comprises a valve spool 116V having a first land 198 on which the hydraulic pressure supplied through the first port 190 acts, the first land 198 having a relatively small diameter, a second land 200 on which the hydraulic pressure supplied through the first port 190 acts to selectively open and close the second port 192, and a third land 202 which, together with the second land 200, selectively communicates the second port 192 and the third port 194. Further, an elastic member 204 is disposed between the third land 202 and the valve body, the elastic member 204 biasing the valve spool 116V in a leftward direction (in the drawing).

When the third solenoid valve S3 is controlled to on, the valve spool 116V of the third pressure control valve 116 is displaced to the right (in the drawing) such that the second port 192 is closed. However, if the third solenoid valve S3 is controlled to off, control pressure is supplied to the third pressure control valve 116 such that the valve spool 116V of the same is displaced to the left (in the drawing), thereby resulting in the communication of the second port 192 and the third port 194.

The line pressure control switch valve 120 is controlled by the fourth solenoid valve S4 and provided with a first port 210 for receiving drive D range pressure, a second port 212 for supplying the drive D range pressure to the first clutch C1, a third port 214 for receiving hydraulic pressure from the first pressure control valve 112, a fourth port 16 for supplying the hydraulic pressure received through the third port 214 to the pressure regulating valve 102, and a fifth port 218 for receiving control pressure of the fourth solenoid valve S4.

The line pressure control switch valve 120 comprises a valve spool 120V having a first land 220 on which. the control pressure supplied through the fifth port 218 acts, a second land 222 for selectively opening and closing the third and fourth ports 214 and 216, and a third land 224 for selectively opening and closing the first and second ports 210 and 212. An elastic member 226 is disposed between the third land 24 and the valve body to bias the valve spool 120V leftward (in the drawing).

Therefore, the line pressure control switch valve 120 supplies the hydraulic pressure fed from the manual valve 118 to the first clutch C1 in the first, second, third and fourth speeds of the drive D range, and supplies the hydraulic pressure fed from the first pressure control valve 112 to the pressure regulating valve 102 in the second, third and fourth speeds of the drive D range.

The N-R control valve 124 is controlled in the reverse R range by the control pressure supplied from the second pressure control valve 114 and acts to supply the hydraulic pressure supplied to the manual valve 118 to the first brake B1. The N-R control valve 124 is provided with a first port 230 communicated with the second pressure control valve 114, a second port 232 communicated with the reverse R range pressure line 132, and a third port 234 for selectively supplying the hydraulic pressure received through the second port 232 to the first brake B1 via the first fail-safe valve 126.

The N-R control valve 124 includes a valve spool 124V having a first land 236 on which the hydraulic pressure supplied to the first port 230 acts, and a second land 238 for opening and closing the second and third ports 232 and 234. Further, an elastic member 240 is disposed between the second land 238 and the valve body to bias the valve spool 124V in a rightward direction (in the drawing).

The low control valve 122 is either controlled by hydraulic pressure supplied to the second clutch C2 in third and fourth speeds or by a part of the hydraulic pressure supplied to the first brake B1 in the reverse R range, and acts to supply the control pressure of the third pressure control valve 116 to the first brake B1 in the low L range.

The low control valve 122 is provided with a first port 250 receiving low L range pressure, a second port 252 for supplying the hydraulic pressure received through the first port 250 to the first fail-safe valve 126 as control pressure, a third port 254 for receiving from the first fail-safe valve 126 the hydraulic pressure supplied to the second clutch C2, and a fourth port 256 for receiving as control pressure a part of the hydraulic pressure supplied to the first brake B1.

The low control valve 122 includes a valve spool 122V having a first land 258 on which the control pressure supplied to the third port 214 acts to selectively open and close the first port 210, and a second land 260 for selectively communicating the second port 252 with an exhaust port. Further, an elastic member 262 is disposed between the second land 260 and the valve body, the elastic member 262, together with the control pressure supplied through the fourth port 256, providing a biasing force to the valve spool in a leftward direction (in the drawing).

The first fail-safe valve 126 is controlled by control pressure supplied from the low control valve 122 and by control pressure supplied from the second pressure control valve 114. In the third and fourth speeds of the drive D range, the first fail-safe valve 126 undergoes port conversion to supply the hydraulic pressure supplied from the third pressure control valve 116 to the second clutch C2, and in the low L range, the first fail-safe valve 126 undergoes port conversion to supply the hydraulic pressure supplied from the third pressure control valve 116 to the second brake B2.

The first fail-safe valve 126 is provided with a first port 270 for receiving control pressure from the low control valve 122, a second port 272 for receiving hydraulic pressure from the third pressure control valve 116, a third port 274 for receiving hydraulic pressure from the N-R control valve 124, a fourth port 276 for selectively supplying the hydraulic pressure supplied to the second port 272 to the second clutch C2, fifth and sixth ports 278 and 280 for supplying the hydraulic pressure supplied to the third port 274 to the first brake B1 and the low control valve 122, and a seventh port 282 for receiving control pressure from the second pressure control valve 114.

The first fail-safe valve 126 includes a valve spool 126V having a first land 282 on which the control pressure received through the first port 270 acts, a second land 284 selectively communicating the second port 272 and the fourth port 276, and, together with the first land 282, communicating the third port 274 with the fifth and sixth ports 278 and 280, and a third land 286 on which the control pressure received through the seventh port 282 acts. Further, an elastic member 288 is disposed between the third land 286 and the valve body, the elastic member 288 providing a biasing force to the valve spool in a leftward direction (in the drawing).

The second fail-safe valve 128 selectively supplies hydraulic pressure supplied from the second pressure control valve 114 to the second brake B2. The second fail-safe valve 128 is provided with first, second, third and fourth ports 290, 292, 294, 296 connected respectively to the reverse R range pressure line 132, the fourth clutch C4, the third pressure control valve 116 and the drive D range pressure line 136, a fifth port 198 for receiving hydraulic pressure from the second pressure control valve 114, and a sixth port 300 for supplying the hydraulic pressure supplied to the fifth port 298 to the second brake B2.

The second fail-safe valve 128 includes a valve spool 128V having first, second and third lands 302, 304 and 306 on which the hydraulic pressure supplied respectively through the first, second and third ports 290, 292 and 294 acts, a fourth land 308 selectively communicating the sixth port 300 with an exhaust port and the fifth port 298, a fifth land 320 selectively communicating the fifth port 298 with the sixth port 300, and a sixth land 312 on which control pressure received through the fourth port 296 acts, the sixth land 312 being surrounded by a sleeve 314 of the valve body.

The brake control switch valve 130 supplies hydraulic pressure supplied from the manual valve 118 to the fourth clutch C4 in the first and third speeds of the drive D3 range and in the low L range. The brake control switch valve 130 is provided with a first port 320 for receiving control pressure from the second pressure control valve 114, a second port 322 connected to the drive D3 range pressure line 138, the drive D2 range pressure line 138 being connected to the manual valve 118, and a third port 324 for supplying the hydraulic pressure supplied to the second port 322 to the fourth clutch C4.

The brake control switch valve 130 includes a valve spool 130V having a first land 326 on which the hydraulic pressure supplied through the first port 320 acts, and a second land 328 selectively communicating the second port 322 and the third port 324. An elastic member 330 is disposed between the second land 328 and the valve body, the elastic member 330 providing a biasing force to the valve spool in a leftward direction (in the drawing).

Also, the 3-way valve 140 is provided between the drive D2 range pressure line 140 and the brake control switch valve 130 so as to supply hydraulic pressure to the fourth clutch C4 through a port conversion by hydraulic pressure supplied to the drive D2 range pressure line 140 and the break control switch valve 130.

In the neutral N range of the hydraulic control system of the present invention structured as in the above, as shown in FIG. 3, the hydraulic pressure generated as a result of the hydraulic flow created by the fluid pump 100 is controlled to a predetermined level of hydraulic pressure by the pressure regulating valve 104. The hydraulic pressure is then reduced by passing through the reducing valve 110 then supplied to each the damper clutch control valve 108, and the first, second and third pressure control valves 112, 114 and 116. At this time, the first and second solenoid valves S1, S3 and S4 are controlled to OFF by the ECU, thereby resulting in the flow of hydraulic pressure as shown in FIG. 3.

Figure 7:
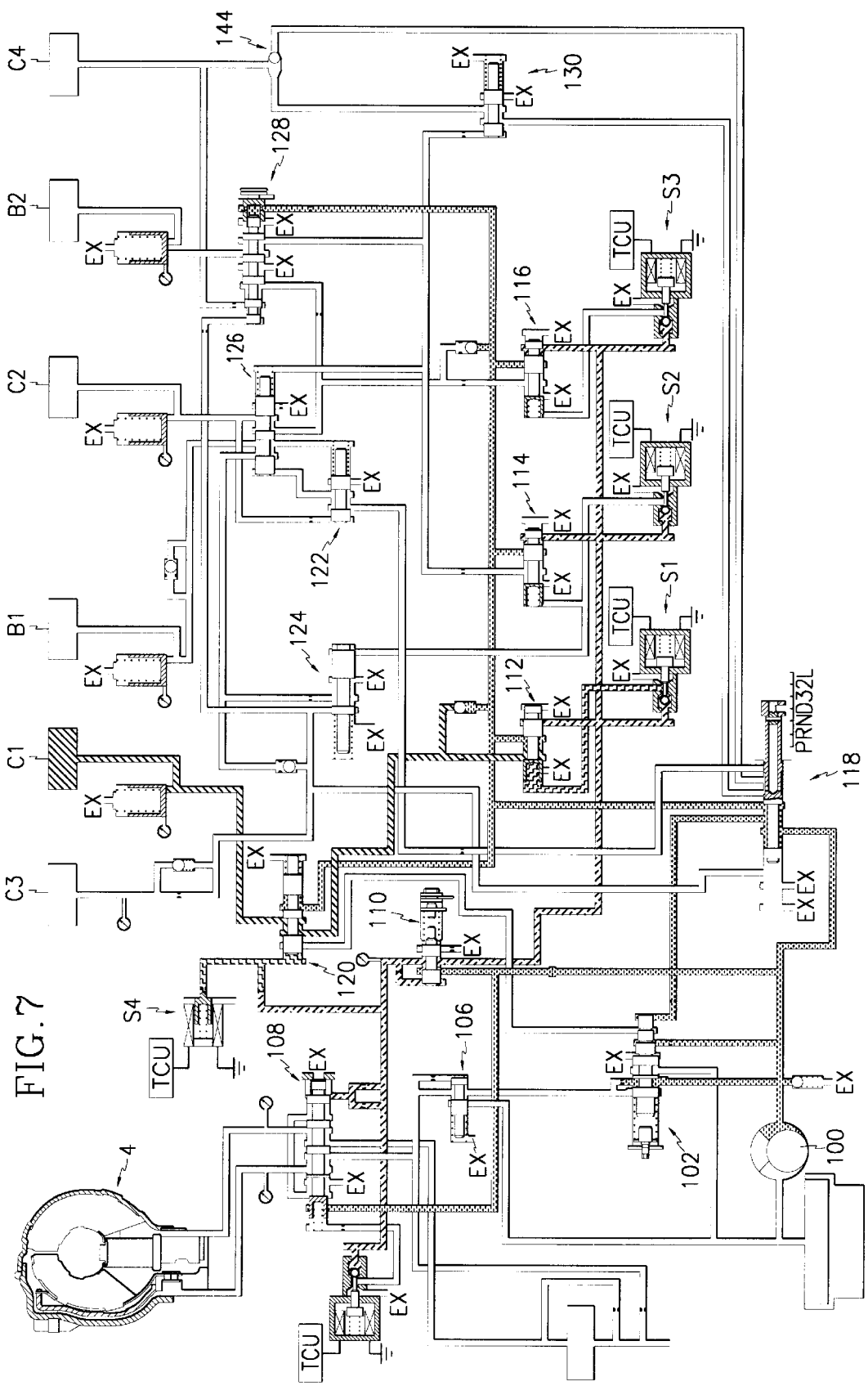
FIG. 7 is a hydraulic circuit diagram in a first speed of a drive D range of the hydraulic control system of FIG. 3.

In the first speed of the drive D range, as shown in FIG. 7, the hydraulic pressure supplied from the manual valve 118 is supplied to the pressure regulating valve 104 via the forward pressure line 134, and, at the same time, is supplied via the drive D range pressure line 136 to the line pressure control switch valve 120 and the first, second and third pressure control valves 112, 114 and 116. At this time, since the first solenoid valve S1 is duty-controlled and the fourth solenoid valve S4 is controlled to off state after it is temporarily turned on, the hydraulic pressure is controlled by the first pressure control valve 112 and supplied to the first clutch C1, realizing the first speed.

Figure 8:
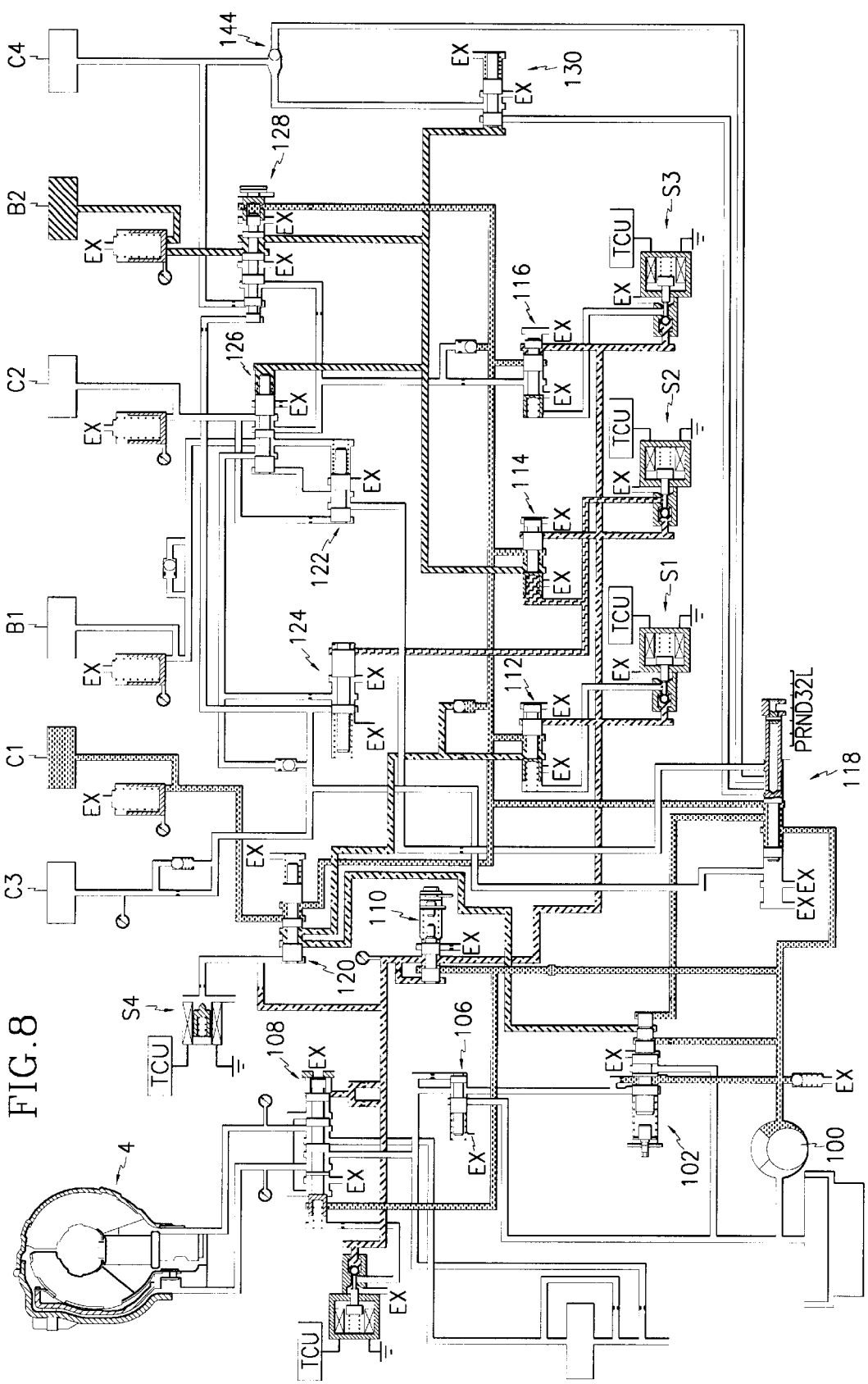
FIG. 8 is a hydraulic circuit diagram in a second speed of the drive D range of the hydraulic control system of FIG. 3.

If vehicle speed and throttle opening are increased in the first speed of the drive D range, shifting into the second speed of the drive D range is performed. That is, as shown in FIG. 8, the second solenoid valve S2, which is controlled to ON by the ECU in the first speed of the drive D range, is duty-controlled such that the control pressure of the second pressure control valve 114 is supplied to the second brake B2 via the first fail-safe valve 128, realizing the second speed.

Figure 9:
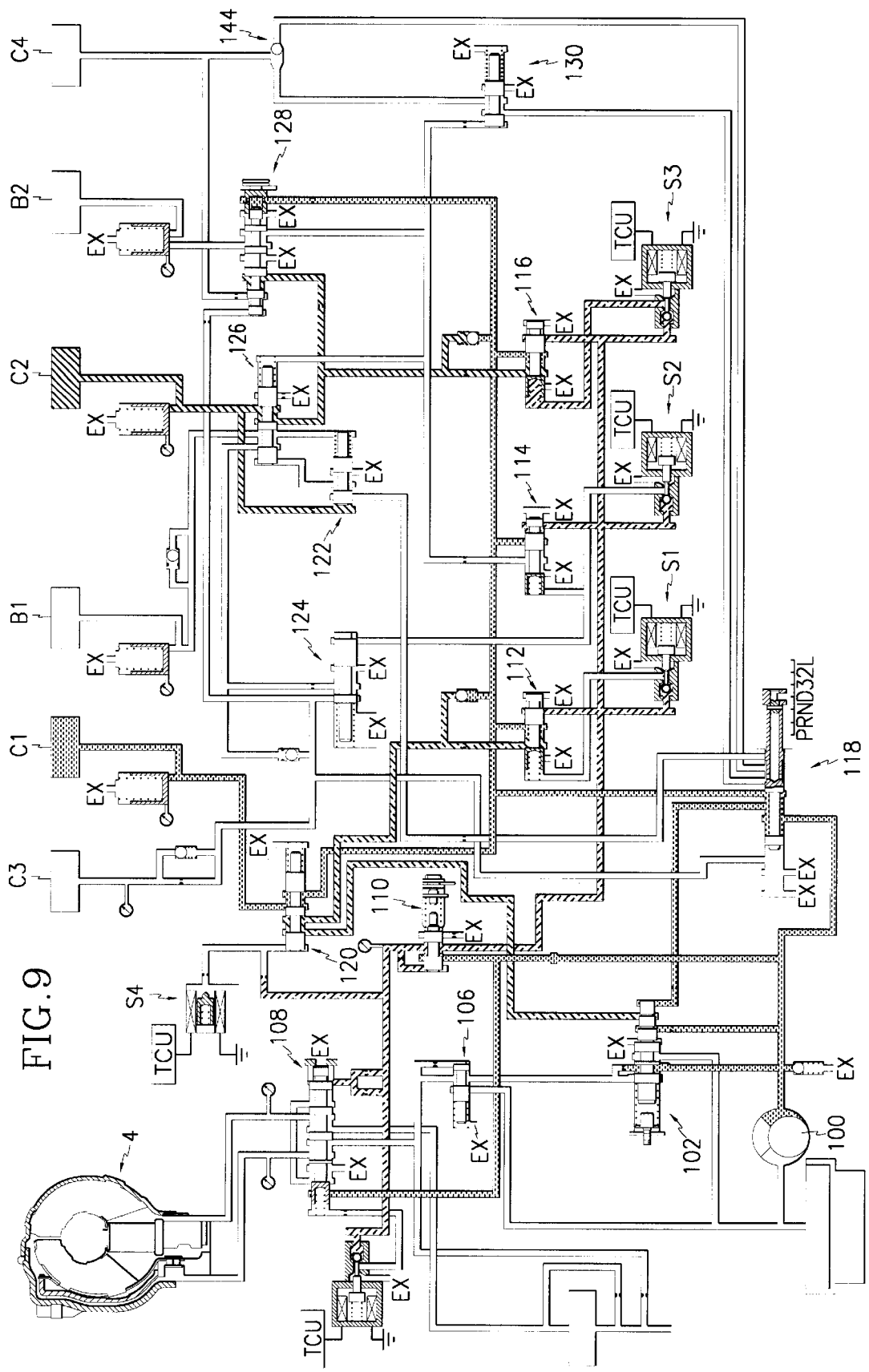
FIG. 9 is a hydraulic circuit diagram in a third speed of the drive D range of the hydraulic control system of FIG. 3.

If vehicle speed and throttle opening are increased in the second speed of the drive D range, shifting into the third speed of the drive D range is performed. That is, as shown in FIG. 9, the second solenoid valve S2 is controlled to ON and the third solenoid valve S3 is controlled to OFF by the ECU. Accordingly, the hydraulic pressure supplied from the second pressure control valve 114 is discontinued such that the second brake B2 is disengaged, and, at the same time, the hydraulic pressure of the third pressure control valve 16 is supplied to the second clutch C2 through the first fail safe valve 126, realizing the third speed.

Figure 10:
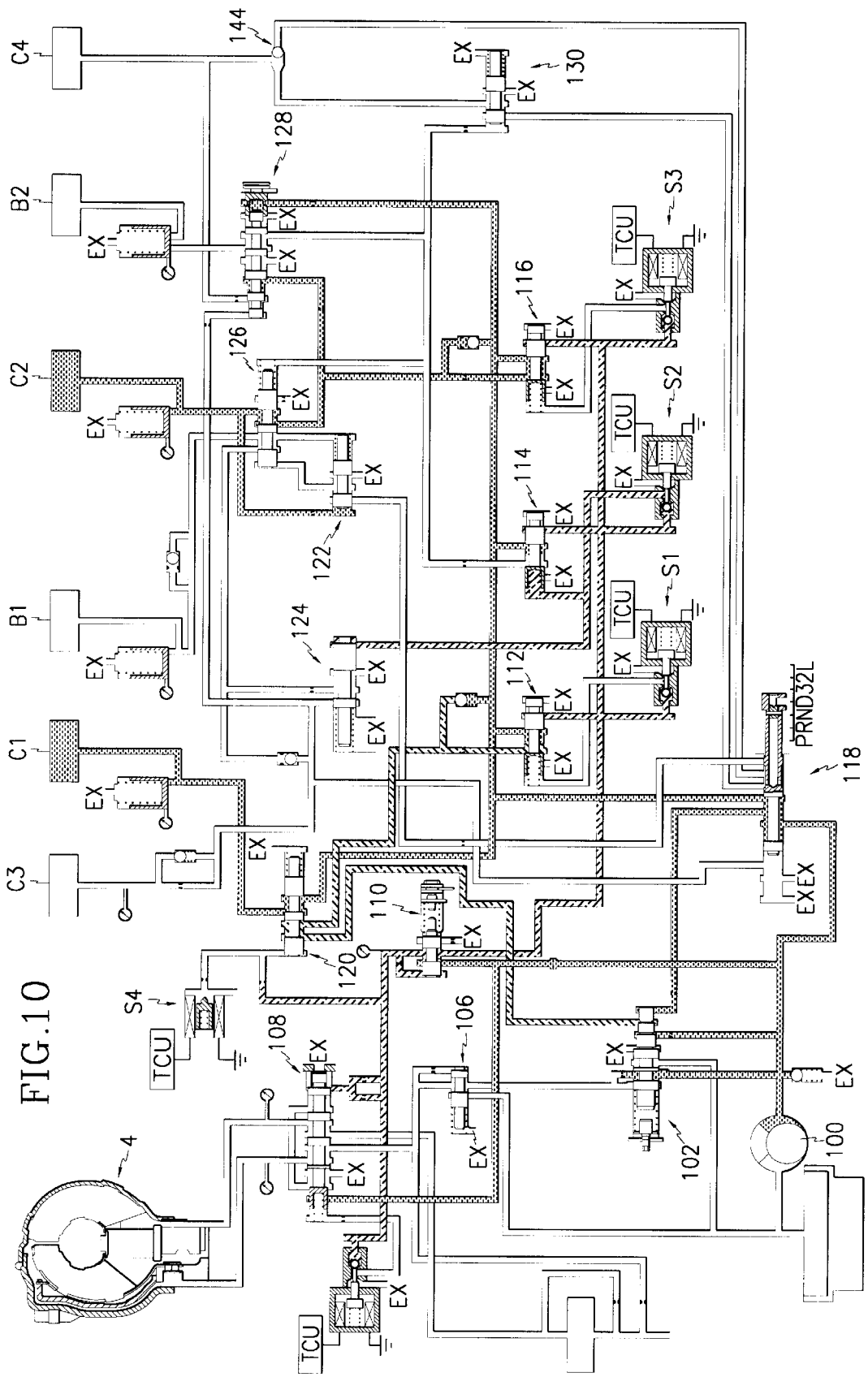
FIG. 10 is a hydraulic circuit diagram in a fourth speed of the drive D range of the hydraulic control system of FIG. 3.

If vehicle speed and throttle opening are increased in the third speed of the drive D range, shifting into the fourth speed of the drive D range is performed. That is, as shown in FIG. 10, the second solenoid valve S2 is controlled to OFF such that hydraulic pressure is supplied to the second brake B2 after passing through the second fail-safe valve 128.

Since the first, second, third and fourth solenoid valves S1, S2, S3 and S4 are all controlled to OFF in the fourth speed of the drive D range, if a malfunction occurs in the drive D range, the fourth speed is held by the OFF control of the first, second, third and fourth solenoid valves S1, S2, S3 and S4.

Figure 11:
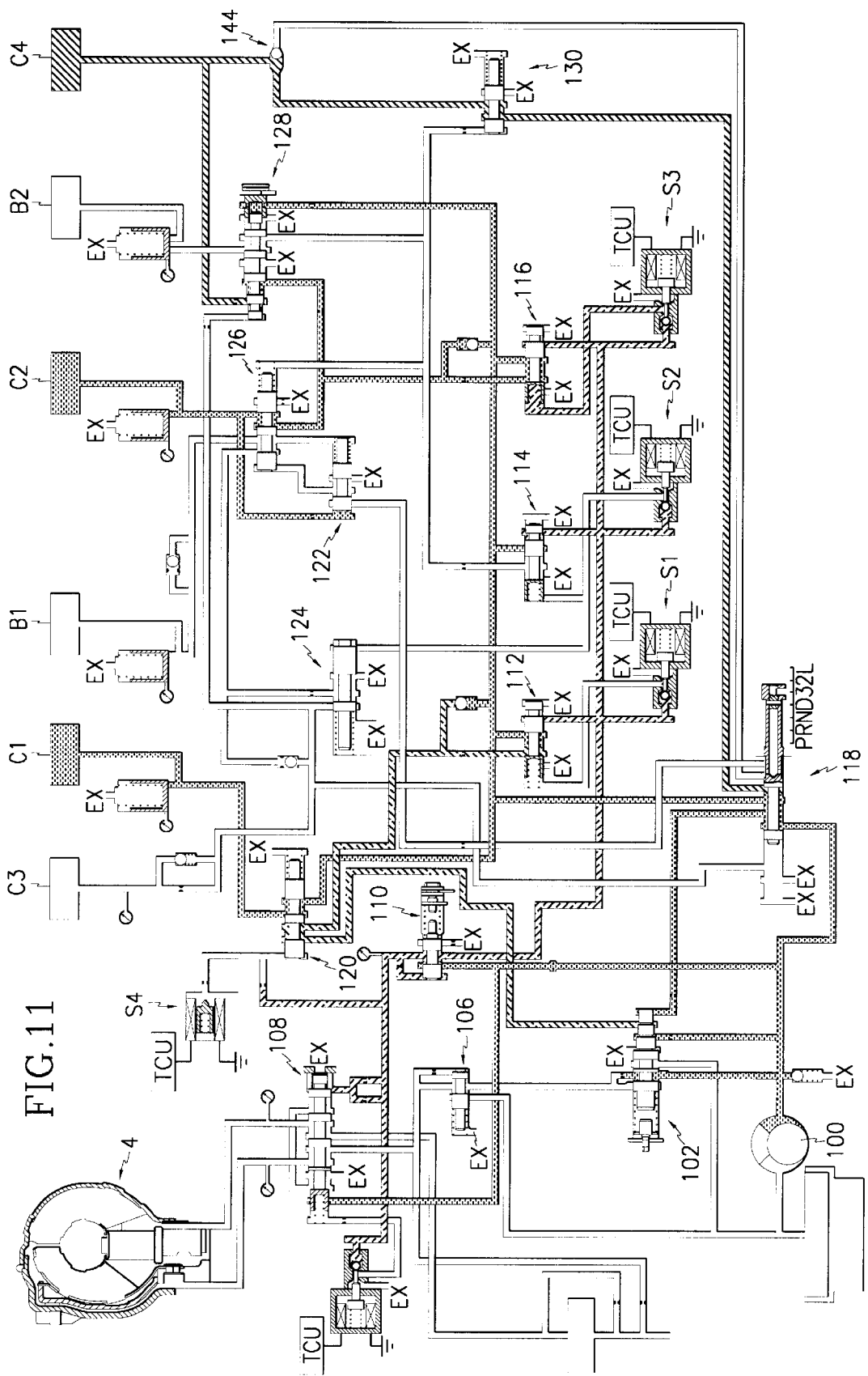
FIG. 11 is a hydraulic circuit diagram in a third speed of a drive D3 range of the hydraulic control system of FIG. 3.

In the drive D3 range, with reference to FIG. 11, hydraulic flow is realized identically as in the third speed of the drive D range. At this time, hydraulic pressure supplied to the drive D3 range pressure line 138 from the manual valve 118 is supplied to the fourth clutch C4 via the engine brake control switch valve 130. If a malfunction occurs in the transmission while in the drive D3 range, the first and third solenoid valves S1 and S3 are controlled to OFF, thereby holding the third speed of the drive D range.

Figure 12:
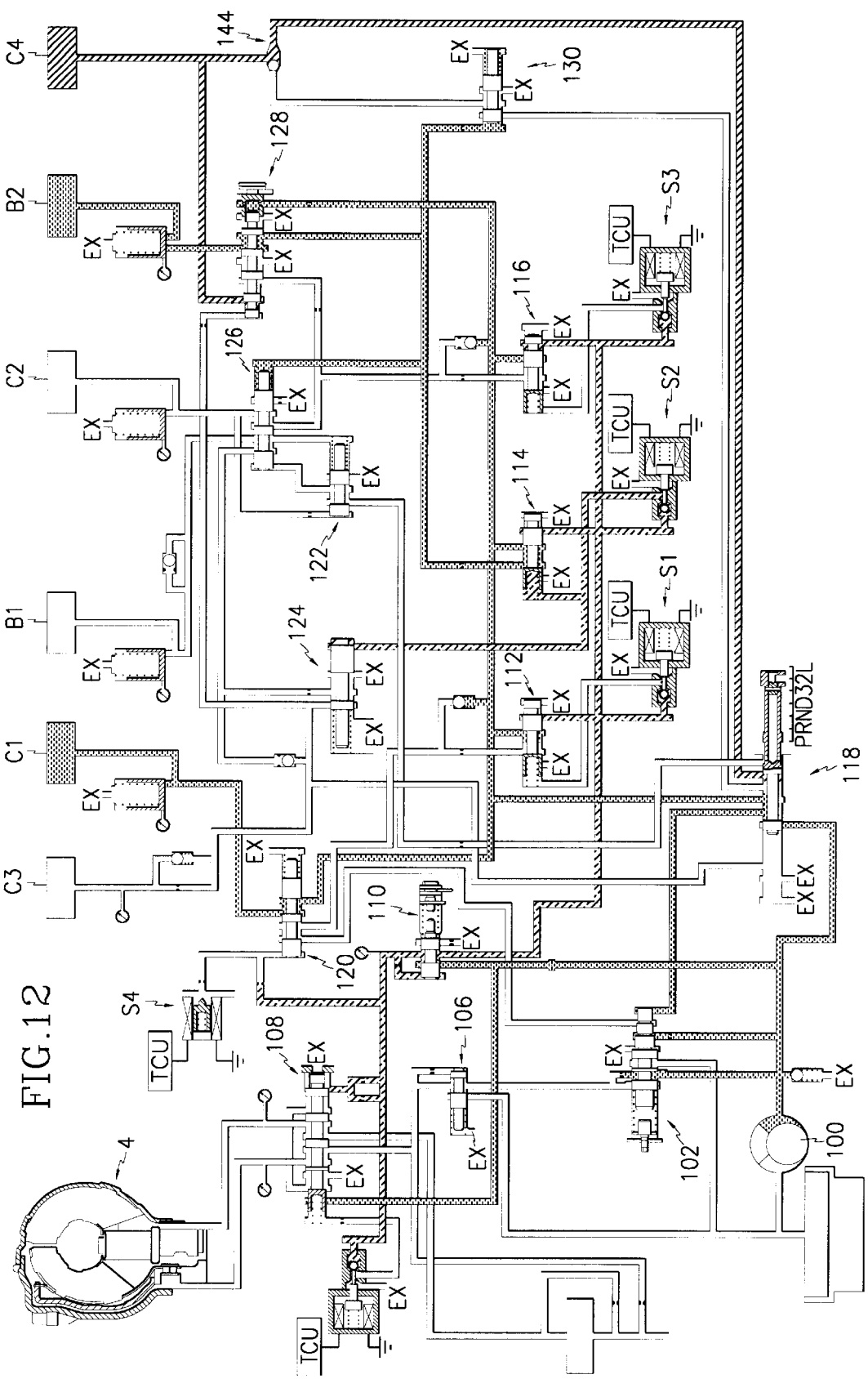
FIG. 12 is a hydraulic circuit diagram in a second speed of a drive D2 range of the hydraulic control system of FIG. 3.

In the drive D2 range, with reference to FIG. 12, hydraulic flow is realized indentically as in the second speed of the drive D range. At this time, hydraulic pressure supplied to the drive D2 range pressure line 140 from the manual valve 118 is supplied to the fourth clutch C4 via the 3-way valve 144 to operates the engine brake.

In the first speed of the low L range, hydraulic pressure of the manual valve 118 is directly supplied to the first clutch C1 via the switch valve 120, and at the same time, as the third solenoid valve S3 is controlled to off, hydraulic pressure of the third pressure control valve 16 is supplied to the first brake B1 via the first fail safe valve 126.

Figure 13:
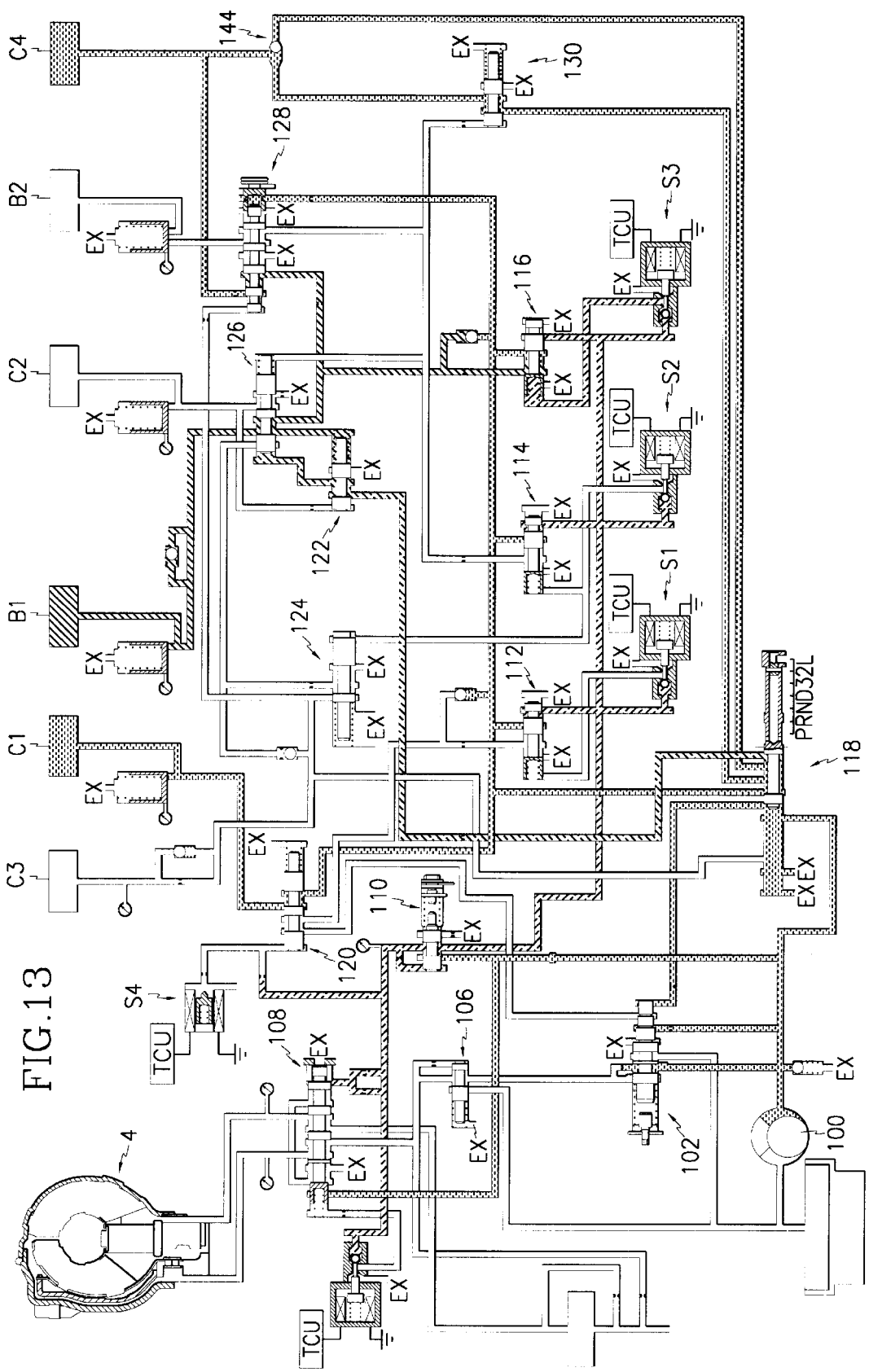
FIG. 13 is a hydraulic circuit diagram in a first speed of a low L range of the hydraulic control system of FIG. 3.

In addition, the D2 range pressure is directly supplied to the fourth clutch C4, operating the engine brake (see FIG. 13).

Figure 14:
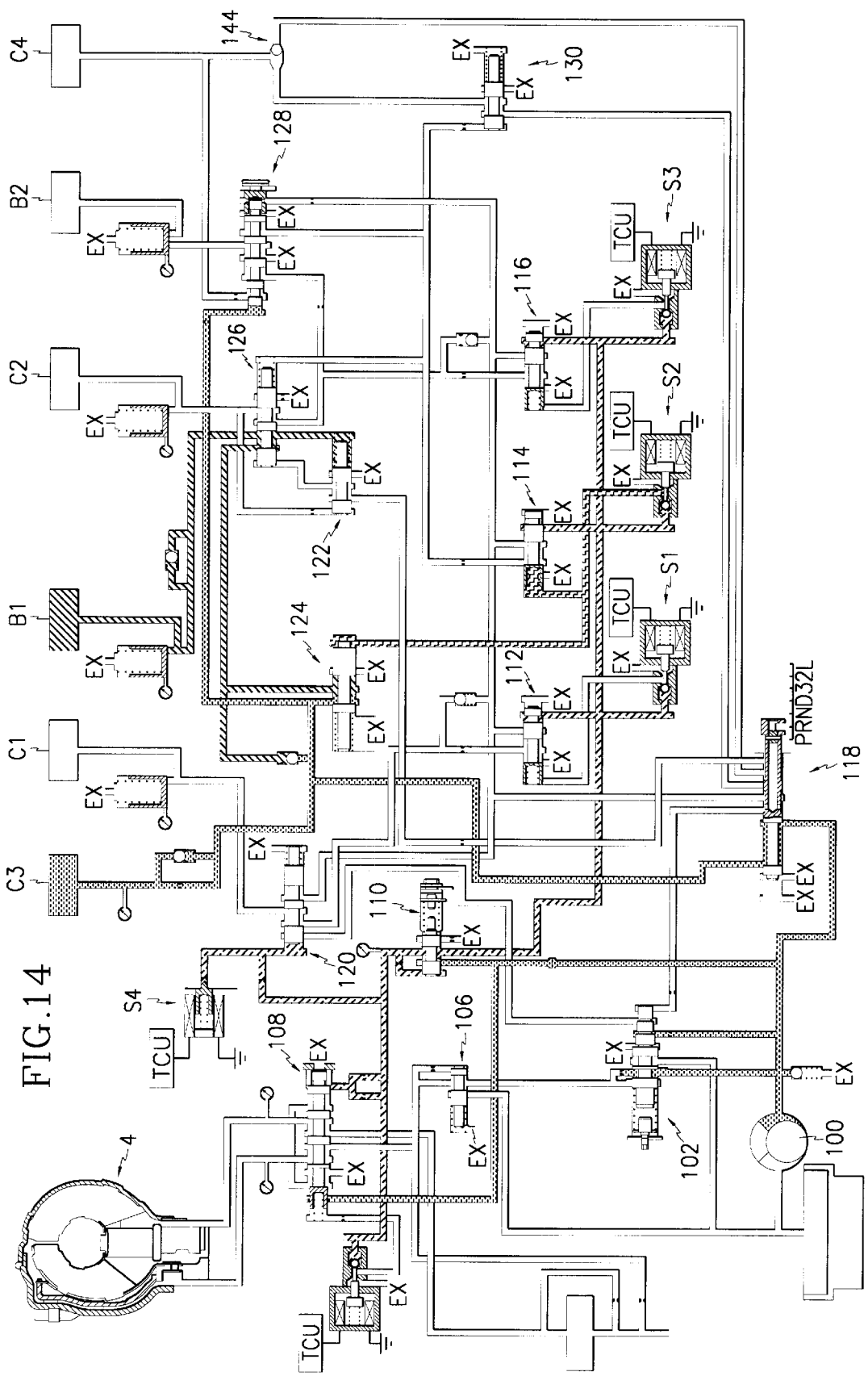
FIG. 14 is a hydraulic circuit diagram in a reverse R range of the hydraulic control system of FIG. 3.

In the reverse R range, as shown in FIG. 14, part of the hydraulic pressure of the reverse R range pressure line 132 of the manual valve 118 is supplied directly to the third clutch C3, and that portion of hydraulic pressure is controlled by the N-R control valve 122 and supplied to the first brake B1 via the first fail-safe valve 126. At this time, the hydraulic pressure supplied to the first brake B1 is controlled while the N-R control valve 124 is controlled by the control pressure of the second solenoid valve S2.

In addition to the above shift operations, downshifting from the fourth to the third speeds, from the third to the second speeds, and from the second to the first speeds, in addition to skip shifting from the fourth to the second speeds is also possible. However, since such shift operations fall within the scope of the present invention presented above, a detailed description will not be provided herein.

In the hydraulic control system of the present invention applied to a powertrain utilizing two single pinion planetary gearsets, four clutches, two one-way clutches, and two brakes to obtain four forward speeds and one reverse speed, an engine brake is operated at only a high stage of each range such that drive performance is improved. Also, a fail-safe mode is provided by the hydraulic control system of the present invention by holding the fourth speed in the drive D range and the third speed in the drive D3 range such that drive performance is improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for an automatic transmission, comprising:

a shift controller having a manual valve cooperating with a driver-controlled select lever to supply hydraulic pressure through range lines;

a hydraulic pressure controller including first, second and third pressure control valves which are controlled by reducing pressure controlled by first, second and third solenoid valves, the first, second and third pressure control valves controlling hydraulic pressure supplied from the manual valve a line pressure controller including a line pressure control switch valve and a fourth solenoid valve for controlling the switch valve, the switch valve selectively supplying hydraulic pressure from the first pressure control valve and drive D range pressure from the manual valve to a first clutch and a pressure regulating valve; and a pressure distributor comprising:
a low control valve for forming a hydraulic pressure line in a low L range such that control pressure of the third pressure control valve is supplied to the first brake;
an N-R control valve for controlling reverse pressure supplied to the first brake using control pressure from the second pressure control valve in a reverse R range;
a first fail-safe valve controlled by control pressure supplied from the low control valve and from the second pressure control valve, the first fail-safe valve undergoing port conversion to supply hydraulic pressure supplied from the third pressure control valve to a second clutch in the third and fourth speeds of the drive D range, and hydraulic pressure supplied from the third pressure control valve to a second brake in the low L range;
a second fail-safe valve for supplying hydraulic pressure supplied from the second pressure control valve; and
an engine brake control switch valve for supplying D-range pressure to a fourth clutch in the first and third speeds of the drive D range.

2. A hydraulic control system of claim 1 wherein the manual valve is connected to a reverse R range pressure line directly communicated with the third clutch, a forward pressure line connected to the pressure regulator valve, a drive D range pressure line connected to the first, second and third pressure control valves and the second fail-safe valve, a drive D3 range pressure line connected to the engine brake control switch valve, a drive D2 range pressure line connected to the fourth clutch with a 3-way valve disposed on the drive D2 range pressure line, and a low L range pressure line connected to the low control valve.

3. A hydraulic control system of claim 1 wherein the first, second and third solenoid valves are 3-way valves which maintain a closed state when controlled to OFF.

4. A hydraulic control system of claim 1 wherein the first pressure control valve is provided with a first port for receiving the hydraulic pressure reduced by the reducing valve, a second port for receiving hydraulic pressure from the manual valve, a third port for supplying the hydraulic pressure received through the second port to the line pressure control switch valve, and a fourth port for receiving control pressure from the first solenoid valve.

5. A hydraulic control system of claim 1 wherein the second pressure control valve is provided with a first port for receiving hydraulic pressure reduced by the reducing valve, a second port for receiving hydraulic pressure from the manual valve, a third port for supplying the hydraulic pressure received through the second port to the first and second fail-safe valves and the brake control switch valve, a fourth port for receiving control pressure from the second solenoid valve, and a fifth port for supplying the hydraulic pressure received through the fourth port to the N-R control valve as control pressure.

6. A hydraulic control system of claim 1 wherein the third pressure control valve is provided with a first port for receiving hydraulic pressure reduced by the reducing valve, a second port for receiving hydraulic pressure from the manual valve, a third port for supplying the hydraulic pressure received through the second port to the first and second fail-safe valves, and a fourth port for receiving control pressure from the third solenoid valve.

7. A hydraulic control system of claim 1 wherein the line pressure control switch valve is provided with a first port for receiving drive D range pressure, a second port for supplying the drive D range pressure to the first clutch, a third port for receiving hydraulic pressure from the first pressure control valve, a fourth port for supplying the hydraulic pressure received through the third port to the pressure regulating valve, and a fifth port for receiving control pressure of the fourth solenoid valve.

8. A hydraulic control system of claim 1 wherein the N-R control valve is provided with a first port communicated with the second pressure control valve, a second port communicated with the reverse R range pressure line, and a third port for selectively supplying the hydraulic pressure received through the second port to the first brake via the first fail-safe valve.

9. A hydraulic control system of claim 1 wherein the low control valve is provided with a first port receiving low L range pressure, a second port for supplying the hydraulic pressure received through the first port to the first fail-safe valve as control pressure, a third port for receiving from the first fail-safe valve the hydraulic pressure supplied to the second clutch, and a fourth port for receiving as control pressure a part of the hydraulic pressure supplied to the first brake.

10. A hydraulic control system of claim 1 wherein the first fail-safe valve is provided with a first port for receiving control pressure from the low control valve, a second port for receiving hydraulic pressure from the third pressure control valve, a third port for receiving hydraulic pressure from the N-R control valve, a fourth port for selectively supplying the hydraulic pressure supplied to the second port to the second clutch, fifth and sixth ports for supplying the hydraulic pressure supplied to the third port to the first brake and the low control valve, and a seventh port for receiving control pressure from the second pressure control valve.

11. A hydraulic control system of claim 1 wherein the second fail-safe valve is provided with first, second, third and fourth ports connected respectively to the reverse R range pressure line, the fourth clutch, the third pressure control valve and the drive D range pressure line, a fifth port for receiving hydraulic pressure from the second pressure control valve, and a sixth port for supplying the hydraulic pressure supplied to the fifth port to the second brake.

12. A hydraulic control system of claim 1 wherein the engine brake control switch valve is provided with a first port for receiving control pressure from the second pressure control valve, a second port connected to the drive D3 range pressure line, the drive D2 range pressure line being connected to the manual valve, and a third port for supplying the hydraulic pressure supplied to the second port to the fourth clutch.

13. A hydraulic control system of claim 6 wherein the fourth clutch receives D3-range pressure either via the engine brake control switch valve or directly from a drive D2 range pressure line.

14. A hydraulic control system of claim 1 wherein the engine brake control switch valve and the drive D2 range pressure line are connected to the fourth clutch with a 3-way valve interposed therebetween.

15. A hydraulic control system for an automatic transmission, comprising:
   a shift controller having a manual valve cooperating with a driver-controlled select lever to supply hydraulic pressure through range lines;
   a hydraulic pressure controller including first, second and third pressure control valves which are controlled by reducing pressure controlled by first, second and third solenoid valves that are controlled by a transmission control unit, the first, second and third pressure control valves controlling hydraulic pressure supplied from the manual valve
   a line pressure controller including a line pressure control switch valve and a fourth solenoid valve for controlling the switch valve, the switch valve selectively supplying hydraulic pressure from the first pressure control valve and drive D range pressure from the manual valve to a first clutch and a pressure regulating valve; and
   a pressure distributor for controlling hydraulic pressure directed to friction elements,
   wherein in a drive D range, the first, second and third solenoids valves are all controlled to off states so that the vehicle speed can be held at a fourth speed even if the transmission control unit malfunctions; and
   in a drive D3 range, the first and third solenoids valves are controlled to off states so that the vehicle speed can be held at a third speed even if the transmission control unit malfunctions.

16. A hydraulic control system of claim 15 wherein the pressure distributor comprises
   a low control valve for forming a hydraulic pressure ling in a low L range such that control pressure of the third pressure control valve is supplied to the first brake;
   an N-R control valve for controlling reverse pressure supplied to the first brake using control pressure from the second pressure control valve in a reverse R range;
   a first fail-safe valve controlled by control pressure supplied from the low control valve and from the second pressure control valve, the first fail-safe valve undergoing port conversion to supply hydraulic pressure supplied from the third pressure control valve to the second clutch in the third and fourth speeds of the drive D range, and hydraulic pressure supplied from the third pressure control valve to a second brake in the low L range;

a second fail-safe valve for supplying hydraulic pressure supplied from the second pressure control valve; and an engine brake control switch valve for supplying D-range pressure to the fourth clutch in the first and third speeds of the drive D range.

* * * * *